US012222722B2

(12) United States Patent
Gyllenhammar et al.

(10) Patent No.: US 12,222,722 B2
(45) Date of Patent: *Feb. 11, 2025

(54) PLATFORM FOR PATH PLANNING SYSTEM DEVELOPMENT FOR AUTOMATED DRIVING SYSTEM

(71) Applicant: Zenseact AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: Zenseact AB, Gothenburg (SE)

( * ) Notice: Subject to any disclaimer, the term of this patent is extended or adjusted under 35 U.S.C. 154(b) by 143 days.

This patent is subject to a terminal disclaimer.

(21) Appl. No.: 17/729,470

(22) Filed: Apr. 26, 2022

(65) Prior Publication Data

US 2022/0350336 A1   Nov. 3, 2022

(30) Foreign Application Priority Data

Apr. 29, 2021  (EP) ..................................... 21171222

(51) Int. Cl.
*G05D 1/00* (2024.01)

(52) U.S. Cl.
CPC ......... *G05D 1/0214* (2013.01); *G05D 1/0088* (2013.01); *G05D 1/0217* (2013.01); *G05D 1/0221* (2013.01); *G05D 1/0223* (2013.01)

(58) Field of Classification Search
CPC .. G05D 1/0214; G05D 1/0088; G05D 1/0217; G05D 1/0221; G05D 1/0223
See application file for complete search history.

(56) References Cited

U.S. PATENT DOCUMENTS

| | | | |
|---|---|---|---|
| 2017/0089710 A1* | 3/2017 | Slusar | G06V 20/58 |
| 2019/0113917 A1 | 4/2019 | Buch et al. | |
| 2019/0333386 A1* | 10/2019 | Horita | G08G 1/166 |
| 2020/0174481 A1* | 6/2020 | Van Heukelom | G01C 21/3407 |
| 2020/0241542 A1 | 7/2020 | Sung | |
| 2022/0051175 A1* | 2/2022 | O'Herlihy | G06V 20/52 |
| 2022/0274592 A1* | 9/2022 | Ma | B60W 60/0025 |

FOREIGN PATENT DOCUMENTS

WO   2020/079074 A2   4/2020

OTHER PUBLICATIONS

Extended European Search Report mailed Nov. 8, 2021 for European Application No. 21171222.9, 5 pages.

* cited by examiner

*Primary Examiner* — Khoi H Tran
*Assistant Examiner* — Christopher Scott
(74) *Attorney, Agent, or Firm* — Sage Patent Group

(57) ABSTRACT

The present invention relates to a method and apparatus that utilize production vehicles to develop new path planning features for Automated Driving Systems (ADSs) by using federated learning. To achieve this the "under-test" path planning module's output is evaluated in closed-loop in order to produce a cost-function that is subsequently used to update or train a path planning model of the path planning development-module.

15 Claims, 6 Drawing Sheets

PLATFORM FOR PATH PLANNING SYSTEM DEVELOPMENT FOR AUTOMATED DRIVING SYSTEM

CROSS-REFERENCE TO RELATED APPLICATIONS

The present application for patent claims priority to European Patent Office Application Ser. No. 21171222.9, entitled "PLATFORM FOR PATH PLANNING SYSTEM DEVELOPMENT FOR AUTOMATED DRIVING SYSTEM" filed on Apr. 29, 2021, assigned to the assignee hereof, and expressly incorporated herein by reference.

TECHNICAL FIELD

The present disclosure relates to methods and systems for performance evaluation and development of a path planning module of a vehicle equipped with an Automated Driving System (ADS). In particular, the present invention relates to a closed-loop evaluation of a path planning development-module of a vehicle, and subsequent updating/training thereof.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Much of the current efforts for development of ADSs revolves around safely launching a first system to the market. However, once that is achieved it will be paramount to improve the system in a safe and efficient manner, both to achieve cost reductions as well as performance improvements. Generally, there are significant costs associated with the development and verification of safety of the ADS (or of "ADS features"), especially related to field tests and the understanding of how the system behaves in traffic. Moreover, there are additional challenges in terms of managing the immense amounts of data generated by ADS equipped vehicles in order to develop and verify various ADS features, not only from a data storage, processing and bandwidth perspective, but also from a data security/privacy perspective.

There are multitudes of different research reports containing various approaches proposed in order to find and execute such a safe and reliable path, and there is further entire research-fields dedicated to finding the optimal path given a set of different constraints. The analytical approaches focus on finding paths given the predictions and states of objects surrounding the vehicle. There is yet another class of methods to obtain paths for a self-driving vehicle, relying on machine learning or deep neural network to do the work of picking a suitable path. Many of the currently known methods rely on detailed modelling of the surrounding environment to finally capture these models within a (complex) set of constraints of the following optimisation problem of finding the optimal path. However, with increasingly complex operating situations and operational domains of the ADS finding and executing such "safe" paths might prove to be extremely difficult, if not impossible.

Moreover, when providing paths for execution by ADSs it is common to create one component or module, which provides a suggestion for a path and another component that checks if this path can be safely executed. The second checker-component is conventionally implemented using heuristics as this is one of the few ways to ascertain the integrity/safety of the component. One other approach is letting it rest on formal arguments or equations. However, the heuristic-based method requires that the team making the implementations is knowledgeable of all possible situations and further that no errors are done when determining the heuristics. As mentioned, with increasingly complex operating situations and operational domains of the ADS constructing such a complete set of heuristics that can check the path safety might prove to be an insurmountable amount of work. Similarly, formal methods fall under the same issues to account for all possible outcomes. For some solutions it has yet only been able to integrate one type of manoeuvre (longitudinal or lateral) for handling violations to their safety zone, as the combination has turned out to be difficult to formally show.

There is accordingly a need in the art for new solutions for facilitating development, verification and validation of path planning functions for ADSs in order to continuously be able to provide safer and more performant systems. As always, the improvements shall preferably be made without significant impact on the size, power consumption and cost of the on-board system or platform.

SUMMARY

It is therefore an object of the present invention to provide a method performed by an in-vehicle computing system for automated development of a path planning development-module of a vehicle, a computer-readable storage medium, an apparatus for automated development of a path planning development-module of a vehicle, and a vehicle comprising such an apparatus, which alleviate, mitigate or completely eliminate all or at least some of the drawbacks of presently known solutions.

This object is achieved by means of a method performed by an in-vehicle computing system for automated development of a path planning development-module of a vehicle, a computer-readable storage medium, an apparatus for automated development of a path planning development-module of a vehicle, and a vehicle comprising such an apparatus as defined in the appended claims. The term exemplary is in the present context to be understood as serving as an instance, example or illustration.

According to a first aspect of the present invention, there is provided a method performed by an in-vehicle computing system for automated development of a path planning development-module of an ADS-equipped vehicle. The method comprises obtaining a candidate path from the path planning development-module. The path planning development-module is configured to generate the candidate path for execution by the vehicle based on a path planning model and data indicative of the surrounding environment of the vehicle (e.g. sensor data, IMU data, HD-map data, GNSS data, etc.). The method further comprises obtaining a risk map of a surrounding environment of the vehicle. The risk map is formed based on an actuation capability of the vehicle and a location of free-space areas in the surrounding environment, where the actuation capability comprises an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Moreover, the risk map further has a temporal component indicative of a time evolution of the risk parameters of the area segments based on a predicted temporal evolution of the free-space areas for at least a duration of time defined by a predicted duration of the candidate path.

The method further comprises determining a risk value for the candidate path based on the risk parameters of the area segments to be intersected by the candidate path. Moreover, if the determined risk value satisfies at least one risk criterion, the method further comprises:

Generating, at an output, a first control signal indicative of an instruction for the ADS to execute the candidate path.

Obtaining at least one quality parameter of the executed candidate path, wherein the at least one quality parameter is indicative of a performance of the candidate path in terms of quality and/or comfort of the executed candidate path.

Determining a cost function indicative of a performance of the path planning development-module based on the obtained at least one quality parameter.

Updating one or more parameters of the path planning model by means of an optimization algorithm configured to optimize the determined cost function.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with a third aspect of the present invention there is provided an apparatus for automated development a path planning development-module of an ADS-equipped vehicle. The apparatus comprises control circuitry configured to obtain a candidate path from the path planning development-module. The path planning development-module is configured to generate the candidate path for execution by the vehicle based on a path planning model and data indicative of the surrounding environment of the vehicle. The control circuitry is further configured to obtain a risk map of a surrounding environment of the vehicle, wherein the risk map is formed based on an actuation capability of the vehicle and a location of free-space areas in the surrounding environment. The actuation capability comprises an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Moreover, the risk map further has a temporal component indicative of a time evolution of the risk parameters of the area segments based on a predicted temporal evolution of the free-space areas for at least a duration of time defined by a predicted duration of the candidate path. The control circuitry is further configured to determine a risk value for the candidate path based on the risk parameters of the area segments to be intersected by the candidate path, and if the determined risk value satisfies at least one risk criterion, the control circuitry is further configured to:

Generate, at an output, a first control signal indicative of an instruction for the ADS to execute the candidate path.

Obtain at least one quality parameter of the executed candidate path, wherein the at least one quality parameter is indicative of a performance of the candidate path in terms of quality and/or comfort of the executed candidate path.

Determine a cost function indicative of a performance of the path planning development-module based on the obtained at least one quality parameter.

Update one or more parameters of the path planning model by means of an optimization algorithm configured to optimize the determined cost function.

Still further, in accordance with another aspect of the present invention, there is provided a vehicle comprising a set of vehicle-mounted sensors configured to monitor a surrounding environment of the vehicle. The vehicle further comprises an automated driving system (ADS) having a perception system configured to generate perception data based on sensor data obtained from one or more of the set of vehicle-mounted sensors and a production-platform path planner. Further, the vehicle comprises a path planning development-module configured to generate the candidate path for the vehicle, and an apparatus for automated development of the path planning development-module according to any one of the embodiments disclosed herein. With this aspect of the invention, similar advantages and preferred features are present as in the previously discussed first aspect of the invention.

The herein proposed methods, computer-readable storage media, systems, and vehicles accordingly provide a learning platform that utilizes the production system and sensors of the ADS in order to carry out a federated learning process for new software and hardware versions of various path planning features in autonomous driving applications. In more detail, the herein proposed learning regime relies on a generated risk map that estimates and quantifies a view of the "risk" of the ego-vehicle's surroundings, to ascertain the safety of the generated candidate paths while being able to then train the path planning model to be optimized towards quality and comfort. Thereby readily providing advantages in terms of:

Cost effective and time efficient development of new path planning features for autonomous driving applications, by capitalization of the available production resources in the launched cars to further develop the path planning system.

Robust and reliable safety assurance that allows for closed-loop evaluation of new path planning features.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
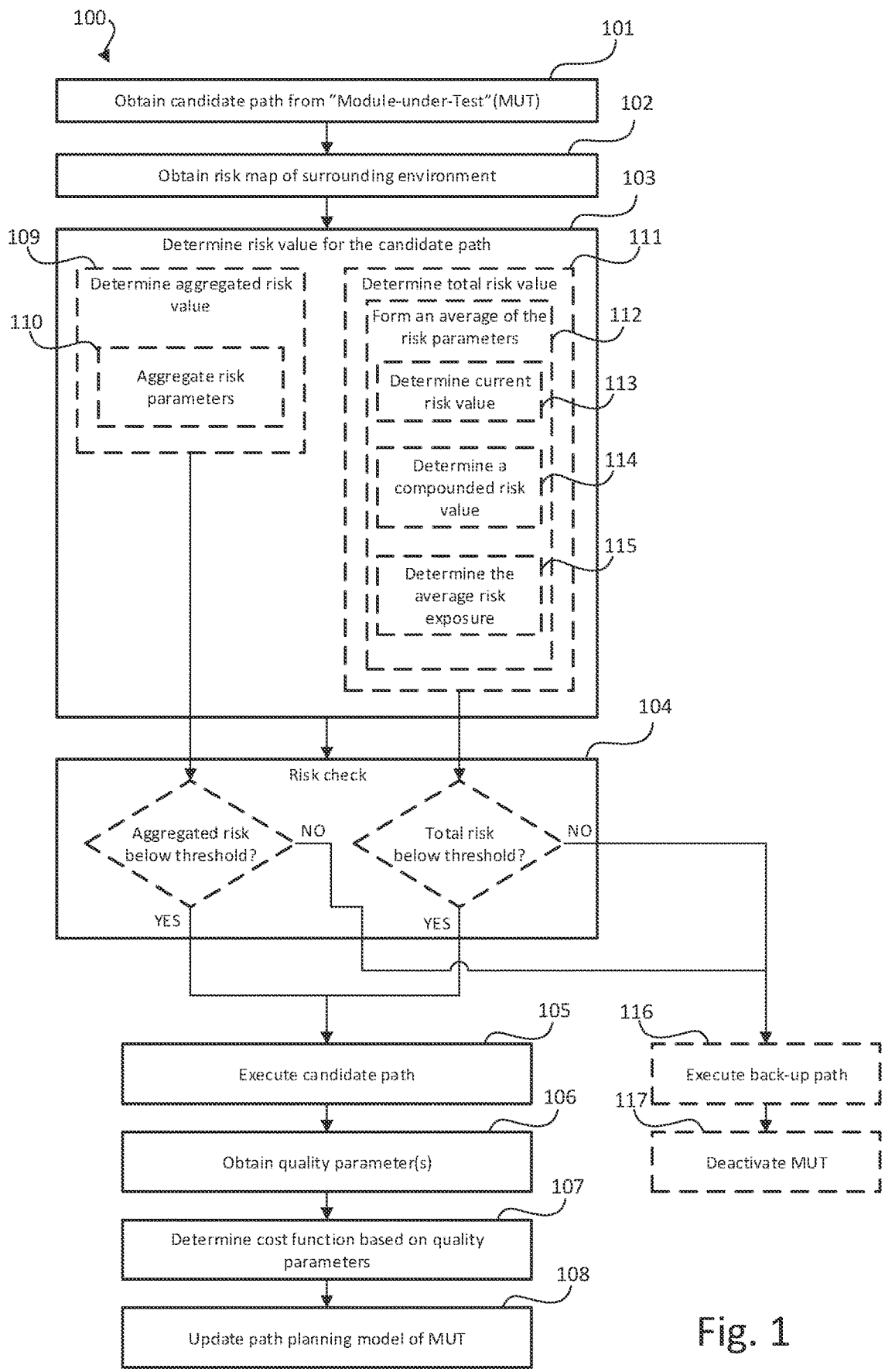
FIG. 1 is a schematic flow chart representation of a method performed by an in-vehicle computing system for automated development of a path planning module of a vehicle in accordance with an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In the present context, a risk map estimates and quantifies a view of the "risk" across the ADS's surroundings (i.e. of the ego-vehicle's surroundings), and preferably includes sensor capabilities, uncertainties in detections and predictions as well as uncertainties in the available capabilities of the vehicle platform.

As mentioned in the background section, presently known processes for developing and launching new path planners for autonomous vehicles require immense amounts of manual work in order to be able to generate paths that can be deemed "safe". It should be noted that the term "safe" in the present context is to be understood as statistically safe above a probability threshold, e.g. a path may be considered safe if the probability of an accident for a path is determined to be less than a threshold defined by a safety norm. Accordingly, one may understand the term "safe" as an absence of risk, or more specifically "safe" may be understood as that a quantified measure of "risk" is below a threshold.

Moving on, in order to mitigate this need for manual work, it is herein proposed to use a real-time risk map of the current situation that the ADS finds itself in as a checker instead. The risk map includes all the potential risk sources including the uncertainties of the measurements from the own sensors, the predictions of movements of available objects, the risk of new objects appearing as well as the capabilities of the vehicle platform that the ADS runs on. If the proposed path for the ADS accumulates sufficiently low risk if executed on the risk map it can be accepted. Thus, using the risk map as a checker will assure that the path is always of sufficiently low risk.

As a consequence, since a generated candidate path is compared against the risk map and therefore considered safe for execution, one is provided the possibility to utilize this in order to train the algorithms responsible for generating these paths to be optimized towards quality/comfort parameters in a closed-loop process. It should be noted that it is here assumed that the path planning model of the "path planning development-module" has reached a sufficient level of maturity to be able to generate "safe" paths such that the risk-map assessment is mainly used as a fail-safe in order to prevent execution of "unsafe" paths. To achieve this "sufficient level of maturity" one may for example utilize the "risk map", as disclosed herein, as a reference framework and train the path planning model against that reference framework in an open-loop process.

Moreover, the risk map can be extended with additional models in the same pace as an expansion across new operational domains of the ADS is conducted and in such a way provide accurate risk estimates. In such a way, the risk map might be easier to maintain and it is further providing a more general concept for checking the suggested paths of the ADSs compared to the heuristic approach.

In more detail, the present invention proposes to use a risk map, which captures all the effects of both the surrounding environment, detections as well as predictions, together with uncertainties in the estimation of those surroundings and the uncertainties of the capabilities of the own vehicle. Rather than approaching the optimisation problem as a complex one constrained by a huge set of variables most of these are captured directly in the risk map. Accordingly, this may lead to a more tractable and performant solution and furthermore, to a solution that is more easily extendable into new domains. As one gains more understanding of the world, within which the ADS operates, it is possible to append the models underpinning the system and feed them into the risk map to continue using the same method of ensuring "safe" paths.

One of the main problems with the conventional methods for formal path checking, is that they do not account for uncertainties. Further, since those models rely heavily on different parameters, like braking capabilities, to assess the validity of the suggested path (or current state) it is paramount that these parameters are correct. To the knowledge of the present inventors there are no other suggestions for how to incorporate these aspects within the currently known models. The risk map on the other hand supplies all of these estimates inherently by including the uncertainties of all aspects of the ADS. Thus, using the risk map for path checking may not only lower the needed implementation efforts when compared to formal or heuristic methods for path checking, but it may further include the dynamic uncertainties inherent to the operational environment of the ADS. The consequence is a more reliable automated path checking and planning solution.

Stated differently, in contrast to conventional path planning solutions relying on heuristic methods to make the safety assessment, the risk map provides an automatic tool for risk aware path planning, minimising the manual labour needed during development. Further, as the models for the surrounding world will necessarily be needed to be improved as the ADS increases its abilities, so will the risk map, as it can be based on much of the same models that the ADS is relying upon. Moreover, when expanding into more complex operational situations the models need to be in place to allow the ADS to conduct itself there, so updated versions of the risk map will be readily available. A heuristic checker on the other hand would be needed to be updated and developed for each change to the operational domain making it difficult to maintain.

The risk map approach, as suggested herein, further provides a dynamic way of accounting for all the potential uncertainties of the environment as well as the vehicle's/ADS's own capabilities when evaluating the safety of a proposed path. In contrast to current methods, the risk map will incorporate information that allows for the risk to be dynamically estimated from all parts of the ADS including sensor, perception system as well as vehicle platform and actuators. This will not only allow the estimates from the risk map to be more accurate compared to static models, but it also enables the paths that are checked to account for more complex behaviours of the surrounding objects as well as to overcome some of the central problems surrounding uncertainties of the static models. The risk map brings the uncertainties from all the sources together to create one collective view of the risks. It accounts for uncertainties of sensor readings, perception system predictions, object models (scenario/behaviour models), and vehicle platform capabilities (braking, steering, etc.).

Figure 3:
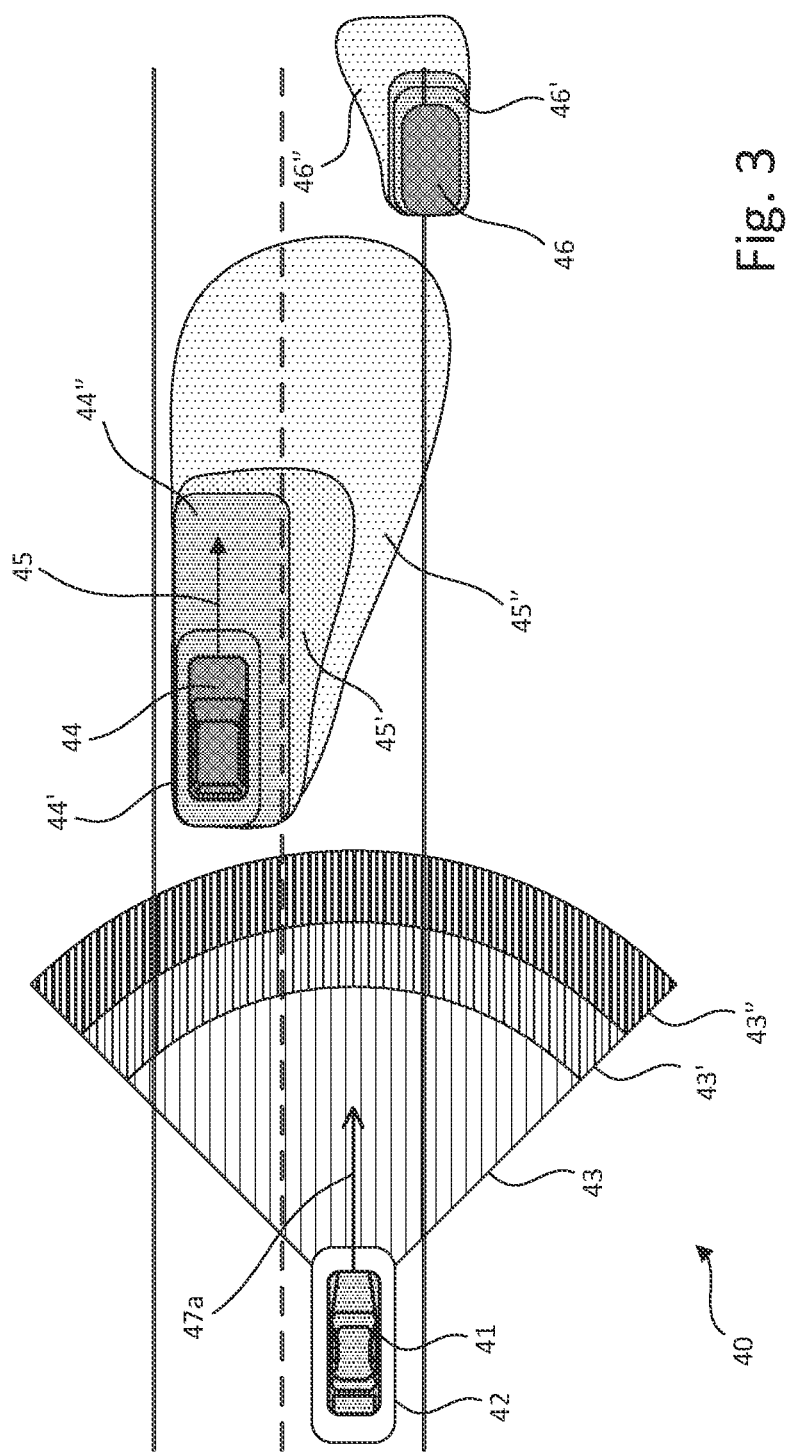
FIG. 3 is a schematic top view illustration of a risk map with some of the different components contributing to the risk map in accordance with an embodiment of the present invention.
Figure 4:
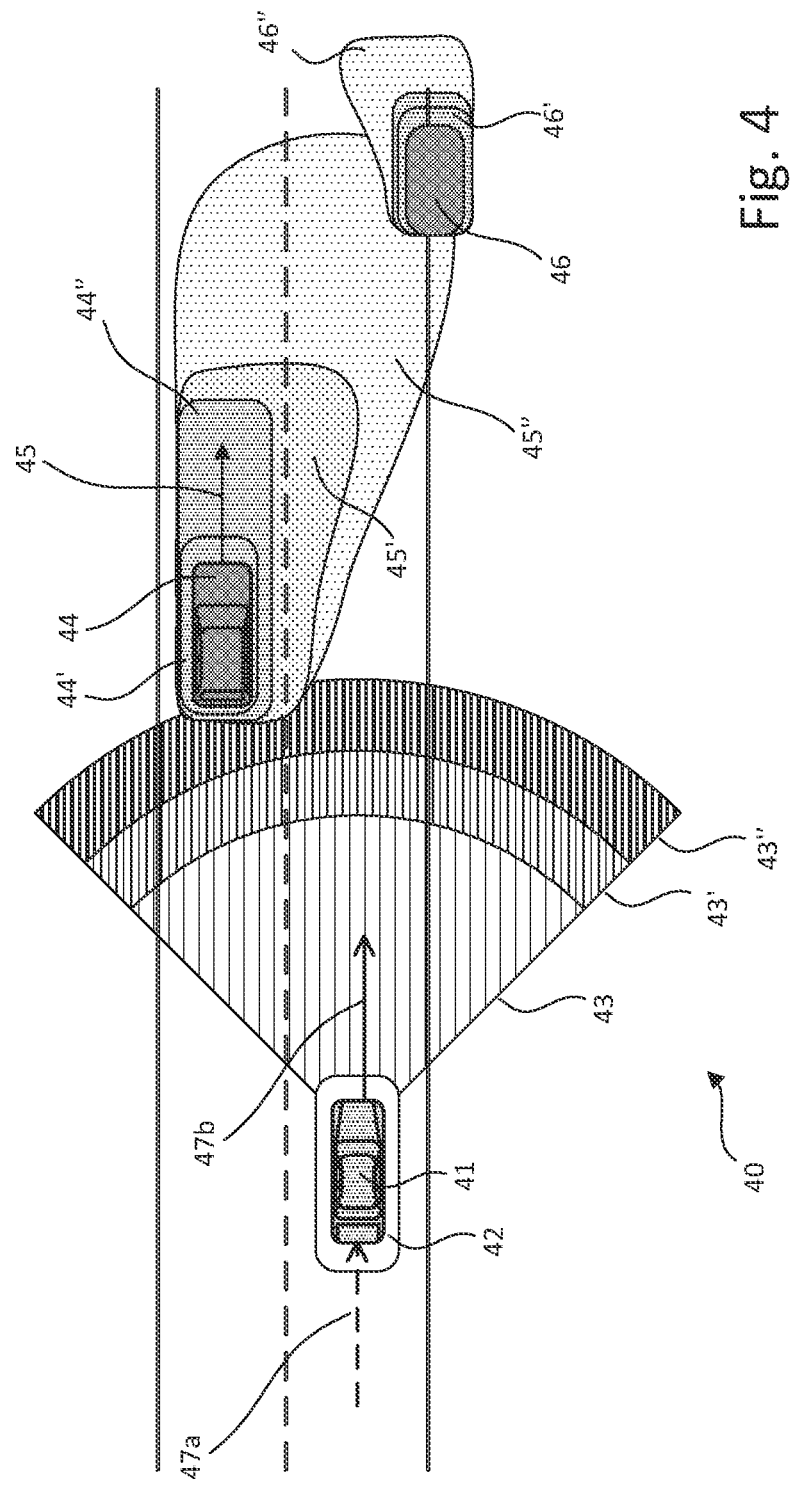
FIG. 4 is a schematic top view illustration of a risk map at a subsequent time step relative to the risk map illustrated in FIG. 3.
Figure 5:
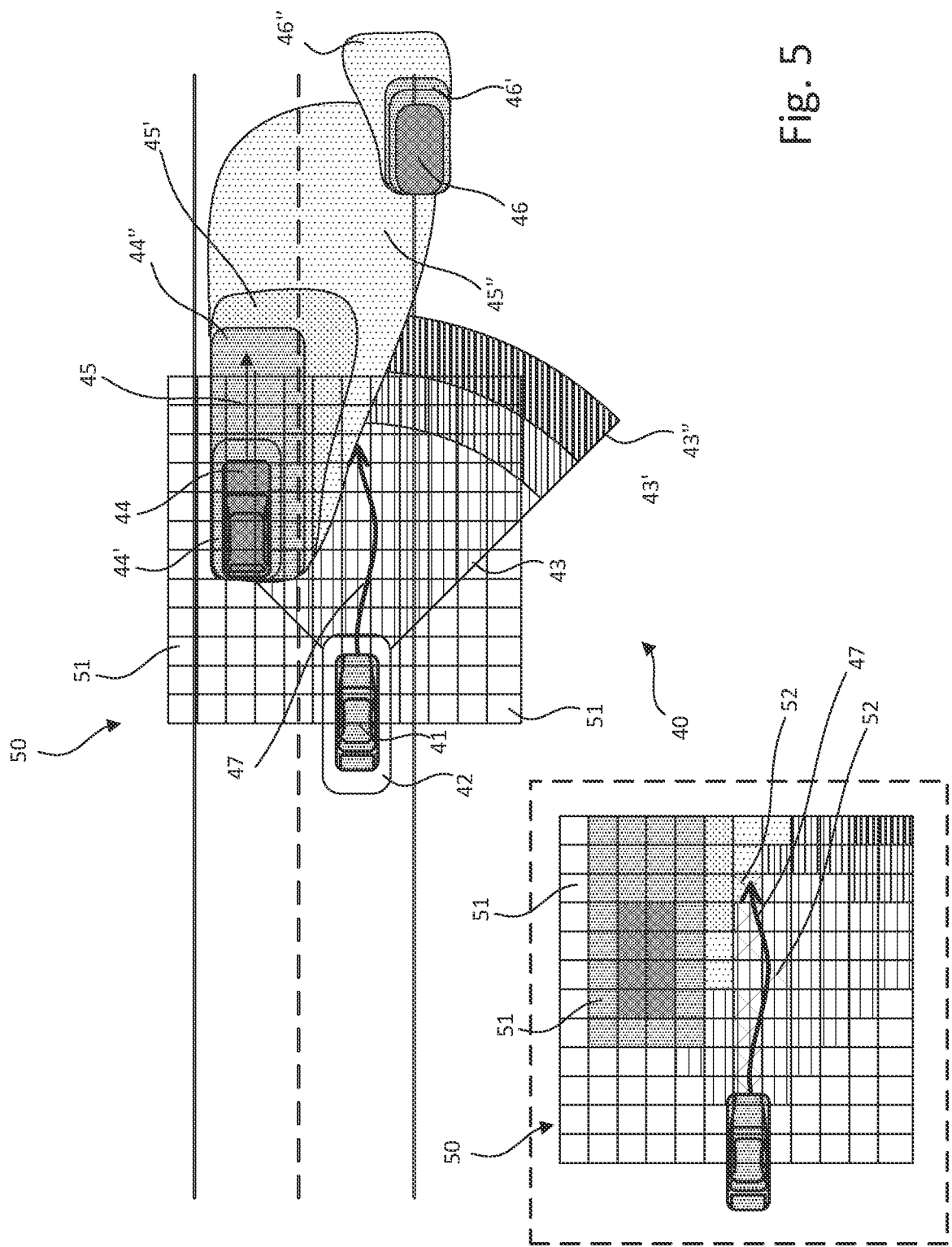
FIG. 5 is a schematic top view illustration of a risk map with area segments indicated in the form of a grid in accordance with an embodiment of the present invention.

Understanding what paths that are safe to execute for the ADS is a critical component to drive the ADS safely. In any given situation the ADS is exposed to a plethora of risks and uncertainties. Quantifying each such risk and uncertainty across the current perceived state of the world provides the ADS with the above-referred "risk map". A schematic example of a risk map is shown in FIGS. 3-5. Such a risk map, where each position around the ADS is associated with a risk, is accordingly used to assess the risk of traversing the positions on the map. In other words, given a path, the risk map is used to assess the risk of that path. Consequently, the level of safety (i.e. level of risk) of a path is calculated using the risk map.

FIG. 1 is a schematic flow chart representation of a method 100 performed by an in-vehicle computing system for automated development of a path planning development-module of a vehicle in accordance with some embodiments of the invention. The vehicle is equipped with an Automated Driving System (ADS), which in the present context comprises all of the different levels of automation as for example defined by the SAE J3016 levels (0-5) of driving automation, and in particular level 4 and 5. In other words, the term ADS encompasses both Advanced Driver-Assistance System (ADAS) and Autonomous Driving (AD).

More specifically, the method 100 relates to closed-loop evaluation of a path planning module of a vehicle, and subsequent updating thereof. The term "closed loop" evaluation may also be referred to as "live testing", and may accordingly be understood as evaluation of the output of the path planning development-module whose generated path are intended to be execute by the vehicle in a real-world scenario.

The method 100 comprises obtaining 101 a candidate path from the path planning development-module. The term "path planning development-module" may also be referred to as a "Module Under Test" (MUT), meaning that is a "new" (under development) software and/or hardware of a path planning feature for automotive applications. In other words, the path planning module may in the present context be understood as software and/or hardware configured to generate a candidate path based on perception data (e.g. raw sensor data or processed sensor data), where the path planning module is currently "under development", and not yet "in production" (e.g. not verified/validated). The vehicle or more precisely, the ADS of the vehicle, may naturally be equipped with a "production path planner", i.e. a path planning module that is part of the production platform/system that is configured to generate paths that are to be executed by the ADS of the vehicle. The term obtaining is herein to be interpreted broadly and encompasses receiving, retrieving, collecting, acquiring, and so forth.

Accordingly, the path planning development-module is configured to generate the candidate path for execution the vehicle based on a path planning model (e.g. a machine learning algorithm, artificial neural network, or the like) and data indicative of the surrounding environment of the vehicle. Thus, the data indicative of the surrounding environment (e.g. perception data) serves as input to the path planning model, and the output of the path planning model is one or more candidate paths. The data indicative of the surrounding environment of the vehicle may for example be perception output (e.g. fused sensor data) generated by a perception system of the vehicle. However, in some embodiments, the data indicative of the surrounding environment of the vehicle may be sensor data obtained directly from one or more vehicle-mounted sensors. Furthermore, the path planning model may also utilize the actuation capabilities of the vehicle as input. The term "actuation capability" as used herein may include one or more of a braking capacity of the vehicle, an acceleration capacity of the vehicle, a steering capacity of the vehicle, and so forth as readily appreciated by the skilled person in the art.

Further, the method 100 comprises obtaining 102 a risk map of the surrounding environment of the vehicle, where risk map is formed based on an actuation capability of the vehicle and a location of free-space areas in the surrounding environment. More specifically, the actuation capability includes an uncertainty estimation for the actuation capability and the location of free-space areas comprises an uncertainty estimation for the estimated location of free-space areas. The risk map further comprises a risk parameter for each of a plurality of area segments comprised in the surrounding environment of the vehicle. Moreover, the risk map comprises a temporal component indicative of a time evolution of the risk parameters of the area segments based on a predicted temporal evolution of the free-space areas for at least a duration of time defined by a predicted duration of the candidate path. The risk map is discussed in further detail in reference to FIGS. 3-5 below.

Each risk parameter may for example be indicative of at least one of a probability of an accident event if the vehicle were to occupy an associated area segment and a probability of violating a predefined safety/risk threshold. Moreover, the location of free-space areas may comprise a position of external objects located in the surrounding environment of the vehicle. Moreover, the estimated position of the external objects may include uncertainties of the position of the external objects, trajectories of any dynamic objects of the external objects and uncertainties of the estimated trajectories of the dynamic objects. In other words, free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may be understood as estimates of areas absent of external objects (static and dynamic objects) as well as an estimate of the uncertainty of this determination, i.e. the risk of the determined location of the free-space area not actually being free. Further, in some embodiments, the location of free-space areas further comprises an estimation of a location of a "driveable area", where in addition to the estimation of areas absent of objects (and the associated uncertainties), the estimation also includes the location/presence of a road surface or "road-like" surface (and the associated uncertainties).

The free-space areas may for example be derived from sensor data of one or more vehicle-mounted sensors configured to monitor the surrounding environment of the vehicle. Nevertheless, the sensor data may also originate from other sensors in the vicinity of the vehicle, e.g. sensors mounted on other vehicles or on infrastructure elements and obtained via a V2V or V2X communication network.

Thus, in some embodiments the location of free-space areas is determined by a dedicated module of the vehicle, where the dedicated module is configured to obtain sensor data indicative of the surrounding environment of the vehicle, and to derive the location of the free-space areas with respect to the vehicle based on the sensor data. Thus, there does not have to be an intermediate step or layer where objects are detected before the location of the free-space areas is obtained, i.e. the "free-space area" may be obtained directly. For example, a signal emitted by a Lidar may propagate through space for a certain distance before it is reflected from some surface, then this area between the Lidar and the surface may be defined as a "free-space area" without any operation or step to define the surface that the signal was reflected from.

The method 100 further comprises determining 103 a risk value for the candidate path based on the risk parameters of the area segments to be intersected by the candidate path. In other words, a check of the obtained 101 candidate path is performed in view of the obtained 102 risk map.

The step of determining 103 the risk value may comprise (a) checking that the candidate path is deemed sufficiently safe for execution at the present time instance, and/or (b) checking that the provided candidate paths of the path planning development-module have been of sufficiently low risk over time. The first metric, labelled as (a) in the foregoing, is herein referred to as an "aggregated risk value", while the second metric, labelled as (b) in the foregoing, is herein referred to as a "total risk value". In the present context, the term "aggregate" is considered to encompass "accumulate".

However, if the determined risk value satisfies at least one risk criterion, i.e. if the obtained 101 candidate path passes a "risk check" 104 in view of the risk map, the method further comprises generating 105, at an output, a first control signal indicative of an instruction for the ADS to execute the candidate path. In more detail, an instruction to execute the obtained 101 candidate path is generated by a decision and control block of the ADS, and the appropriate control signals are sent to one or more actuators of the vehicle so to control the steering, acceleration, deceleration and so forth, of the vehicle.

Further, the method 100 comprises obtaining 106 at least one quality parameter of the executed candidate path, where the at least one quality parameter is indicative of a performance of the candidate path in terms of quality and/or comfort of the executed candidate path. Some examples of applicable quality parameters include lateral acceleration, longitudinal acceleration, vertical acceleration, jerk, vibrations, steering oscillation frequency, path length, roll acceleration, pitch acceleration, yaw acceleration, fuel consumption, as well as other ride quality Key Performance Indicators (KPIs). Moreover, in some embodiments, the at least one quality parameter comprises at least one threat assessment metric, such as e.g. Brake Threat Number (BTN), Time-to-Collision (TTC), Time-to-Brake (TTB), Time-headway, Post Encroachment Time (PET), and so forth.

The method 100 further comprises, determining 107 a cost function indicative of a performance of the path planning development-module based on the obtained at least one quality parameter, and updating 108 one or more parameters of the path planning model by means of an optimization algorithm configured to optimize the determined cost function. Here, it may be noted that the optimization of the cost function does not necessarily mean that the quality parameters should always be minimized or maximized. For example, if a threat assessment metric, such as BTN or PET, is used as one of the quality parameters employed in the cost function, it would not be advantageous to merely minimize that parameter. This is mainly because the algorithm would most likely be trained to bring the vehicle to a complete stop since the "safest" manoeuvre often is to bring the vehicle to a stand-still. Thus, one may optimize the parameters towards certain maximum or minimum values based on a predefined specification, i.e. $\min_x(x, x_{threhold})$ or $\max_x(x, x_{threhold})$.

In the present disclosure, the terms cost function, loss function, and error function are used interchangeably. The purpose of the cost function as defined herein, is accordingly to provide a means to update the path planning model so to maximize desirable output and to minimize unwanted output from the path planning model. In more detail, the cost function is preferably set in relation to one or more pre-defined goals (i.e. predefined target values). For example, one or more pre-defined quality parameter thresholds may be used to form a "goal" for the cost function. In other words, a purpose of the cost function is to minimize or maximize one or more quality parameter values associated with the candidate path, but preferably only until a certain point. As mentioned above, this is in order to avoid potential situations where the path planning is optimized to the level of "realizing" that the "safest" option is to stand still (or at least to "drive" very conservatively, which would be detrimental to user experience). However, one may also impose some fixed constraints (e.g. vehicle must move from A to B) for the optimization algorithm in order to avoid such situations.

Thus, in some embodiments, one or more quality parameters may form constraints for the optimization algorithm, where an example of such a quality parameter (forming a constraint) may be path completion as mentioned above. Stated differently, the optimization algorithm is further configured to employ one or more quality parameters as constraints in the optimization. Additionally, or alternatively, the optimization algorithm may be further configured to employ the at least one risk criterion (and/or some threat assessment metric) as a constraint in the optimization.

In other words, one may use a combination of performance and safety related functions to determine/define 107 the cost function. For incorporating safety, one can use the determined risk value (aggregated and/or total) of the path. In addition, the quality/comfort and other performance related functions could include fuel consumption, comfort levels, jerk and/or acceleration used, etc. These different aspects can then be included in the "learning" process as either, a weighted combination in the cost function, or as constraints to the optimisation problem/algorithm.

Moreover, an equivalent solution would be to determine 107 a corresponding "reward function" in the evaluation to update 108 the one or more model parameters of the path planning model by means of an optimization algorithm configured to maximize the determined "reward function".

Reverting back to the determination 103 of the risk value, in some embodiments, the step of determining 103 the risk value comprises determining 109 an aggregated risk value for the candidate path based on the risk parameters of a set of area segments to be intersected by the candidate path. Thus, the at least one risk criterion comprises an aggregated risk threshold. Moreover, the step of generating 105, at an output, the first control signal indicative of an instruction for the ADS to execute the candidate path is only performed if the determined 109 aggregated risk value is lower than the aggregated risk threshold. Moreover, in some embodiments, the step of determining 109 an aggregated risk value comprises aggregating 110 the risk parameters of the set of area segments to be intersected by the candidate path.

Further, in accordance with some embodiments, the step of determining 103 the risk value further comprises determining 111 a total risk value of the path planning development-module based on the risk parameters of a set of area segments intersected by at least one previously executed path. Here, the set of area segments intersected by at least one previously executed path is associated with a previously obtained risk map of the same time period as the at least one previously executed path. In other words, for each previously executed path it is the set of area segments pertaining to a specific path's risk map that are used for estimating the total risk value. It should be noted that the term "executed path" is to be interpreted broadly and include "at least a portion of a path". As the skilled reader readily understands, the path length may depend on various factors, as may the execution of the same. In more detail, while some may consider a path to be executed only when the "full" path for the entire planning horizon is executed, others may consider every portion of the "full path" that is executed (with a certain sample rate) to constitute an individual "executed path". However, both interpretations are encompassed by the wording "executed path" as used herein. Additionally, it should be noted that if there is no "previously executed path"—i.e. the candidate path that is being evaluated is the first path of the driving session—the total risk may either be disregarded as a metric for that "first" instance, or set to a predefined (start) value below the associated threshold.

Moreover, the at least one risk criterion comprises a total risk threshold, and the step of generating 105, at an output, the first control signal indicative of an instruction for the ADS to execute the candidate path is only performed if the total risk value is lower than the total risk threshold.

Further, in some embodiments, the step of determining 111 the total risk value comprises averaging 112 the risk parameters of the set of area segments intersected by the at least one previously executed path in order to determine 115 an average risk exposure of the path planning development-module, where the average risk exposure defines the total risk value.

As before, the set of area segments intersected by at least one previously executed path is associated with a previously obtained risk map of the same time period as the at least one previously executed path.

Still further, in some embodiments, the step of averaging the risk parameters comprises for each time sample:

Determining 113 a current risk value of the path planning development-module based on a set of area segments intersected by a most recently executed candidate path since a preceding time sample.

Determining 114 a current compounded risk value by summing the current risk value with a previously computed compounded risk value for the preceding time sample. The previously compounded risk value may accordingly in some embodiments be defined as an aggregation of the risk parameters of the area segments that were intersected by already executed paths.

Determining 115 an average risk exposure by dividing the current compounded risk value with a total number of samples used up until and including a current time sample. Here, the total number of samples may be a "total number of previously executed paths".

In other words, for each time sample (after a path for execution has been selected) one calculates the risk (i.e. the aggregated risk value described in the foregoing) of this time instance by aggregating the risk parameters of the area segments intersected by this planned path according to the risk map at this time instance. Then, this "current risk value" is summed with previously calculated risk values of each path that was executed in order to obtain the "current compounded risk value". It should be noted that those previously calculated risk values were determined according to the risk map at those time samples. The total risk value is then computed by dividing the "current compounded risk value" with the total number of samples used up until and including the current time sample.

Moving on, in some embodiments, the method 100 comprises obtaining a back-up path from a production platform of the vehicle. The production platform accordingly comprises a verified/validated path planning development-module configured to generate the back-up path. Then, if the determined risk value fails to satisfy the at least one risk criterion, the method 100 comprises generating 116, at an output, a second control signal so to execute the obtained back-up path, and optionally, also deactivating 117 the path planning development-module. The back-up path may accordingly be understood as a fall-back option should the path planning development-module not be able to supply a sufficiently safe path, wherefore the ADS is configured to supply a back-up path such that the ADS always has a "safe option" to fall back upon. The back-up path may be provided by the production platform's path planning module or any other dedicated module for generating back-up paths for the vehicle.

Still further, in some embodiments, the method 100 further comprises generating, at an output, a second control signal so to activate a path planner of the production platform of the vehicle for generating candidate paths to be executed by the vehicle, if the determined risk value fails to satisfy the at least one risk criterion. In other words, should the aggregated risk breach the threshold and/or should the total risk breach the threshold, the vehicle may be configured to return to relying upon the production platform's path planning module to generate paths for the vehicle to execute.

Further, in the scheme of federated learning, the updated 108 parameters of each of a plurality of vehicles may advantageously be consolidated in a central or cloud unit, whereby a "global update" may be pushed to the entire fleet of vehicles. Therefore, in some embodiments, the method 100 further comprises transmitting the one or more updated 108 parameters of the path planning model to a remote entity (e.g. a back-office or fleet management system). Moreover, the method 100 may comprise receiving a set of globally updated parameters of the path planning model of the path planning module from the remote entity. The set of globally updated parameters are accordingly based on information obtained from a plurality of vehicles comprising a corresponding path planning development-module. Then, the method 100 may comprise updating 107 path planning model of the path planning module based on the received set of globally updated parameters.

The updating or training of the path planning model may be performed "live" with a specified update frequency while the vehicle is running, or when the vehicle is stationary. In the latter case, and in accordance with some embodiments, the output from the cost functions may be stored in a suitable data storage medium and later used in a more "rigorous" update procedure (e.g. at the end of a trip or while the vehicle is charging). Alternatively, the model parameters are only updated at the remote entity (i.e. back-office), thus the output form the cost functions are sent to the remote entity, where they are consolidated across an entire fleet of vehicles, and subsequently pushed in the form of globally updated model parameters to each vehicle. However, in an alternative embodiment, the quality parameters used for forming the cost function are intermediately aggregated and stored, whereupon a cost function is determined based on the aggregated data.

Executable instructions for performing these functions are, optionally, included in a non-transitory computer-readable storage medium or other computer program product configured for execution by one or more processors.

Figure 2:
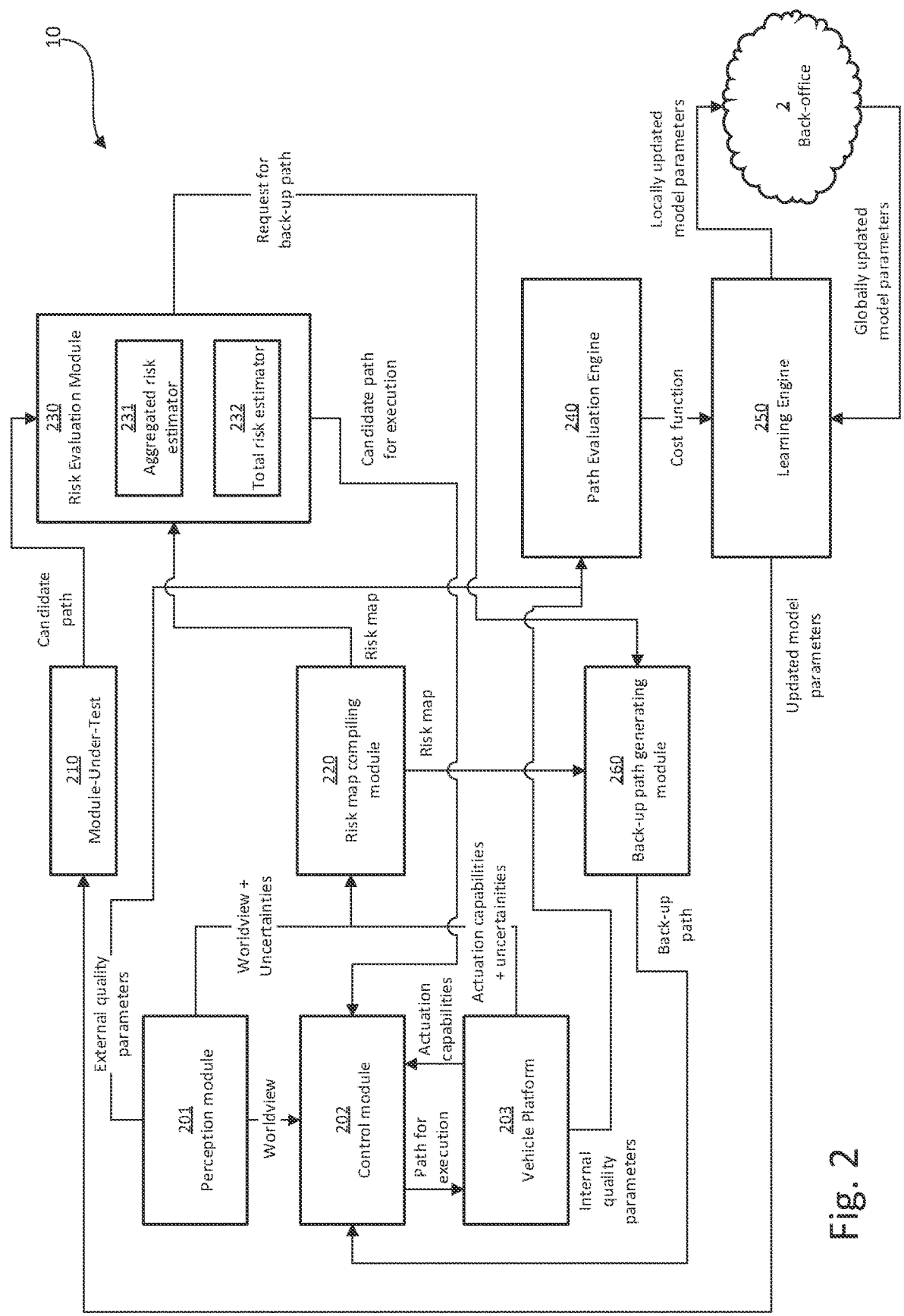
FIG. 2 is a schematic block diagram representation of a system for automated development a path planning module of a vehicle in accordance with an embodiment of the present invention.

FIG. 2 is a schematic block diagram representation of an apparatus or system 10 for automated development of a path planning development-module 210 of an ADS-equipped vehicle in accordance with an embodiment of the present invention. In general, FIG. 2 depicts the flow of information through exposure to an event in the vehicle surroundings, to the path evaluation processes, and further to the transmission and subsequent consolidation in the "back-office" 2. The apparatus or system 10 comprises various control circuitry configured to perform the functions of the methods disclosed herein, where the functions may be included in a non-transitory computer-readable storage medium or other computer program product configured for execution by the control circuitry. FIG. 7 serves to better elucidate the present invention by depicting various "modules" each of them linked to one or more specific functions described in the foregoing.

It should be noted that the "candidate path" that is generated by the path development-module 210 and compared in the "Risk Evaluation Module" 230 may comprise a plurality of candidate paths.

The system 200 has a path planning development-module 210 that is configured to generate the candidate path for the vehicle based on a path planning model and data indicative of the surrounding environment of the vehicle (such as e.g. perception data generated by a perception system 201 of the vehicle). Accordingly, the perception system 201 is configured to generate a perception output based on sensor data obtained from one or more vehicle-mounted sensors during the time period. The sensor data may for example output from one or more of a RADAR device, a LIDAR device, a camera, and ultrasonic sensor, and so forth. In other words, a "perception system" (i.e. the perception system of the production platform) is in the present context to be understood as a system responsible for acquiring raw sensor data from on-board sensors such as cameras, LIDARs and RADARs, ultrasonic sensors, and converting this raw data into scene understanding including state estimates and predictions thereof.

Further, the vehicle's production platform/system is configured to supply a reference framework for evaluating the candidate path. The reference framework is configured to indicate one or more risk values associated with the candidate path when the candidate path is applied in the reference framework. Here, the reference framework is in the form of a risk map generated by a risk map compiling module 220.

The risk map compiling module 220 is configured to generate a risk map based on an actuation capability of the vehicle and a location of free-space areas in the surrounding environment. The actuation capability includes an uncertainty estimation for the actuation capability and the location of free-space areas includes an uncertainty estimation for the estimated location of free-space areas. In other words, the risk map compiler 220 is configured to compile the risk map from the detections and predictions including uncertainties from the perception system 201 and the capabilities and uncertainties reported by the vehicle platform 203 (e.g. steering capabilities, braking capacity, etc.). The risk map may be understood as a virtual map of the surrounding environment of the vehicle with a number of defined area segments, each being associated with a corresponding risk parameter.

Moreover, the risk map further has a temporal component indicative of a time evolution of the risk parameters of the area segments based on a predicted temporal evolution of the free-space areas for at least a duration of time defined by a predicted duration of the candidate path. The predicted temporal evolution may for example be based on the perception data and one or more prediction models (e.g. trajectory predictions, statistical models, etc.).

In accordance with an illustrative example, the obtained actuation capability may comprise a braking capacity and an uncertainty estimation or a type of "error margin" of the obtained braking capacity. For example, if the obtained braking capacity is indicative of the vehicle being able to come to a complete stop (assuming emergency braking actuation) within a distance of 150 meters, then an uncertainty estimation for this estimation may include an error margin of ±15 meters (i.e. ±10%). As mentioned in the foregoing, the actuation capability may be given from statistical models of one or more actuation parameters where the uncertainty estimation for each actuation parameter may be defined by the standard deviation in those statistical models.

Further, the risk map compiler 220 receives a location of free-space areas in the surrounding environment of the vehicle (e.g. from the perception system 201 of the vehicle), where the obtained location of free-space areas comprises an uncertainty estimation for the estimated location of free-space areas. As mentioned in the foregoing, free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may comprise a determined location of external objects (static and dynamic objects), determined trajectories of dynamic objects, as well as an estimate of the uncertainty of the determinations, i.e. the risk of the determined location of the free-space area not actually being free. Further, in some embodiments, the location of free-space areas further comprises an estimation of a location of a "driveable area", where in addition to the estimation of areas absent of objects (and the associated uncertainties), the estimation also includes the location/presence of a road surface or "road-like" surface (and the associated uncertainties).

The compiled risk map is supplied together with the candidate path to a risk evaluation module 230 configured to assess the "safety" of the candidate path in view of the generated risk map for the corresponding time period. In other words, the risk evaluation module 230 is configured to determine a risk value for the candidate path based on the risk parameters of the area segments to be intersected by the candidate path. As mentioned in the foregoing, the risk value may be assessed based on two metrics, aggregated risk value and total risk value, each determined by an aggregated risk estimator 231 and a total risk estimator 232, respectively. In more detail, both of the estimators 231, 232 are configured to evaluate the risk of the candidate path in view of one or more criteria, and if the candidate path satisfies the criteria, a first control signal is generated, where the first control signal indicative of an instruction for the ADS to execute the candidate path.

Thus, safety may be ascertained in the through a simple induction argument. More specifically, if one assumes that the vehicle is in a sufficiently safe state now and the provided path is evaluated to have a sufficiently low risk (according to the risk map) one will subsequently end up in a state that the risk map has shown to be sufficiently safe, wherefore one can then return to the beginning of the argument. Further, the "risk map approach" may also allow one to capture situations where the risk is changing across consecutive paths (this should be captured in the total risk estimate and the evaluation of the path planning development-module may be at least temporarily stopped).

Moving on, once the candidate path that has passed the risk/safety evaluation, a signal is sent to a control block 202 of the ADS, which is configured to instruct the vehicle platform so to execute the candidate path. It should be noted that the candidate path may be sent directly from the path planning development-module to the control block 202 while the risk evaluation module 230 simply supplies a confirmation signal to the control block 202. However, in some example embodiments, the path development-module 210 is a "part" or "sub-module" within the control block 202 of the ADS together with the "production path planner". However, some modules/functions such as the path development-module 210 are here illustrated separately in order to elucidate the present invention. The perception module 201, the control block 202, and the vehicle platform 203 block as illustrated and described herein may be understood as parts/blocks/modules/systems of the "ADS" or "production platform/system".

As the path is being executed, or when it has been executed, a path evaluation engine 240 is configured to obtain at least one quality parameter of the executed candidate path, wherein the at least one quality parameter is indicative of a performance of the candidate path in terms of quality and/or comfort of the executed candidate path. The quality parameters may for example comprise external quality parameters as well as internal quality parameters. External quality parameters may in the present context be understood as parameters indicative of a perceived quality of the path based on data obtained from the vehicle's perception system 201. This may for example include distance to external objects, distance to road edges, distance to lane markers, lane position, Driver Monitoring System (DMS) data, as well as various threat assessment metrics. Internal quality parameters may in the present context be understood as parameters indicative of a perceived quality of the path based on data obtained from the vehicle's IMU or other "internal" sensors. This may for example include lateral acceleration, longitudinal acceleration, vertical acceleration, jerk, roll acceleration, pitch acceleration, yaw acceleration, and fuel/energy consumption.

The path evaluation engine 240 is further configured to determine a cost function indicative of a performance of the path planning development-module based on the obtained at least one quality parameter. This cost function is subsequently provided to a learning engine 250 configured to update one or more parameters of the path planning model by means of an optimization algorithm configured to optimize the determined cost function. Moreover, the learning engine 250 may be configured to transmit the one or more updated parameters of the path planning model of the path planning module to a remote entity 2, and then receive a set of globally updated parameters of the path planning model of the path planning module from the remote entity. The set of globally updated parameters are based on information obtained from a plurality of vehicles comprising a corresponding path planning module. Thereafter, the learning engine 75 may update the path planning model of the path planning module based on the received set of globally updated parameters. This may be construed as a "consolidation" process across an entire fleet of vehicles.

The path planning model of path planning development-module may be updated until a predefined level of maturity is reached or a saturation of learning is achieved, whereupon it may replace the "production path planner". This may for example be indicated by new updates to the model parameters causing an oscillation of the model parameters around some stationary point. Alternatively, or additionally, one may consider setting a threshold for "enough miles driven" with the path planning development-module, and once that threshold is reached (while perhaps fulfilling one or more other activities and conditions), one may conclude that the model is mature enough to replace the currently used "production path planner".

FIGS. 3 and 4 are two schematic top view illustrations of a risk map 40 with some example components 41-46" contributing to the risk map 40, at two consecutive time steps, in accordance with an embodiment of the present invention. Furthermore, the planned path for execution 47a-b of the ego-vehicle is indicated in the map 40. In more detail, dashed line arrows indicate the "candidate path" 47a from the preceding time instance/sample and the current candidate path 47b is indicated by the arrow in front of the vehicle in FIG. 4.

Further, the risk map 40 comprises information indicative of an estimated braking capacity 43 of the vehicle 41 including uncertainty estimation 43', 43" of the same. Further, the risk map 40 comprises a geographical position 41 of the ego-vehicle in the map, the uncertainty estimation 42 of the geographical position 41, a position of external objects 44, 46, uncertainties of the position of the external objects 44', 44", 46', trajectories 45 of dynamic objects 44 and uncertainties 45' 45" of the trajectories 45. The estimated uncertainties may for example be computed based on models (predefined or self-learning/machine-learning) defining a tolerance or error-margin in the measurements provided from the sensors of the vehicle (e.g. cameras, radar, LiDAR, ultrasonic sensors, etc.). Thereby, the formed risk map 40 also accounts for uncertainties inherent in such measurements of the ego-vehicle's worldview caused by for example, sensor manufacturing tolerances, noise, and so forth. Accordingly, the whole risk estimation is rendered more accurate and reliable, more accurately reflecting the actual risk exposure of the ADS of the vehicle. However, in some embodiments, the estimated uncertainties are inherently provided by the production platform's perception system and subsequently incorporated in the generated risk map 40 as readily understood by the skilled artisan.

FIG. 5 is a schematic top view illustration of a risk map at a subsequent time step/sample relative to the risk map depicted in FIG. 4, with area segments 51 indicated in the form of a grid 50 in accordance with an embodiment of the present invention. As described in the foregoing, in order to determine the aggregated risk value of a candidate path 47, one may sum and/or form an average of the risk values associated with the area segments that the planned path 47 intersects 52.

Moreover, the bottom left corner of FIG. 5 shows a schematic top view of a risk map and serves to illustrate how the total risk value may be determined in accordance with some embodiments of the present invention. In more detail, there is depicted a candidate path 47 extending through the risk map 40, which further has an overlaid grid framework 50 in order to exemplify how the area segments may be formed. As described in the foregoing, the risk map 40 has a plurality of area segments 51, each associated with a risk parameter indicative of at least one of a probability of an accident event if the path were to intersect an associated area segment and a probability of violating a predefined safety threshold. The "value" of the risk parameter is indicated in each box 51 by the pattern in the boxes 51. Accordingly, the risk map 40 depicts certain "high risk" area segments 44, "low risk" area segments 43, and values in between.

The risk of a candidate path 47 (i.e. the risk value associated with the candidate path) may be evaluated through one or more ways using the risk map 40. For example one may use the aggregated risk for the candidate path 47 when executed across the risk map 40 (i.e. integral of the path on the risk map). Accordingly, one may aggregate the risk values of the area segments 51 that the candidate path 47 intersects 52, in order to derive an aggregated risk or average risk of the candidate path 47.

With respect to the total risk, the total risk of a drive may be obtained by adding the risk for each planned and executed individual path and normalizing with the time driven. Alternatively, the aggregated risk of the planned paths may be normalized by the number of planned paths if equidistant time steps are used throughout the drive. The total risk may thus be schematically be described as:

$$\text{Total Risk} = \frac{1}{T} \sum_i \int_{path_i} riskmap(x)dx \qquad (1)$$

where T is the total time driven during the considered drive (so far) and the integral is used to account for a more precise calculation of the risk of each planned path as opposed to merely summing the risk parameters of the intersected grid-boxes as mentioned in the example above. It should be noted that the integral in equation (1) is a path integral, where the parameter (x) is taken along the path that is executed. Moreover, by accounting for the number of samples included in the risk calculation itself the system can provide a continuous estimate of the total risk that the path planning development-module has been exposed to (e.g. per time-unit). Thus, the total risk as well as the number of samples used from the previous calculation are fed back to be used in the next iteration to achieve the total risk.

In other words, for each time sample (after a path for execution has been selected) one calculates the risk (i.e. current risk value) of this time instance by aggregating the risk parameters of the area segments intersected by this planned path according to the risk map at this time instance. Then, this "current risk value" is summed with previously calculated risk values of each path that was executed in order to obtain the "current compounded risk value". It should be noted that those previously calculated risk values were determined according to the risk map at those time samples. The total risk value is then computed by dividing the "current compounded risk value" with the total number of samples used up until and including the current time sample.

However, even though it may be implicit, since it is the total risk that is fed back to a total risk estimator, there is an additional step of multiplying the previously calculated total risk with the number of samples used to calculate that total risk, before a new "current risk value" is added to that number. This is more formally presented in the equations (2) and (3) below.

$$TR_t = \frac{CR_t}{T_t} \tag{2}$$

$$TR_{t+1} = \frac{(TR_t \cdot T_t + PR_{t+1})}{T_{t+1}} \tag{3}$$

Here, $TR_t$ represents the total risk value at time instance t, $CR_t$ represents the current compounded risk value, i.e. the aggregated sum of risk parameters that the ADS "has been exposed to" up until and including time instance t, and $T_t$ represents the total number of samples used to calculate the current compounded risk value up until and including time instance t. Equation (3) describes the previously mentioned process where the total risk for the previous time instance (i.e. the fed back total risk) is multiplied with the number of samples used to compute that total risk before it is added to the "current risk value" ($PR_{t+1}$) $PR_{t+1}$ represents the risk value of the planned path at time instance t+1.

Accordingly, as a vehicle manoeuvres through the formed risk map one may obtain a periodically/continuously updated and quantitative estimate of the risk that the vehicle has been exposed to during those manoeuvres. By having the total risk estimated continuously/periodically throughout a drive it is further possible to judge whether the path planning development-module is violating any of the safety requirements. This is particularly advantageous for an ADS of level 4 or higher (according to SAE J3016 levels of driving automation) since it must accommodate for the need of (unexpected) "high-risk" paths to be executed since it is the responsibility of the ADS to drive the vehicle in all instances when/where the ADS is active. However, if the risk level is continuously elevated above an acceptable level this should be acknowledged and appropriate actions should be taken, such as asking for a driver take-back or to disengage the path planning development-module to avoid incidents.

Thus, reverting back to the series of FIGS. 3-4, the following serves as an example of how the total risk value may be determined, and of how the risk value changes over time in accordance with an embodiment of the present invention. FIG. 3 represents the risk map 40 at a first time instance t. Accordingly, in order to compute the total risk, the control system of the vehicle is configured to calculate a current risk value of the ADS (or of the path planning development-module) based on the set of area segments intersected by the currently planned path 47a. In the present example, the current risk value is assumed to be 10-8 based on the set of area segments intersected by the currently planned path 47a. As there is no previously computed total risk value or compounded risk value, the current risk value forms the total risk value at time t.

Moving on to FIG. 4, which represents the risk map 40 at a second, subsequent time instance, t+1. Here, a new path 47b has been planned and selected for execution. Analogously, a current risk value of the ADS is determined based on the set of area segments intersected by the currently planned path 47b. At this time instance, the current risk value is assumed to be $10^{-7}$. Accordingly, a current compounded risk value is determined by summing the current risk value with a previously computed compounded risk value for the preceding time sample, whereby the total risk value at time t+1 is determined by dividing the current compounded risk value with a total number of samples used up until and including a current time sample. Thus, the total risk value at time t+1 is given by equation (4) below.

$$TR_{t+1} = \frac{10^{-8} + 10^{-7}}{2} = 5{,}5 \cdot 10^{-8} \tag{4}$$

Further, in a subsequent (not depicted scenario) the risk map 40 at a third, subsequent time instance t+2. Going along with the same procedure as above, assuming a current risk value of $10^{-7}$ at the third time instance, and utilizing equation (3) the total risk value at time t+2 is given by equation (5) below.

$$TR_{t+2} = \frac{(5{,}5 \cdot 10^{-8}) \cdot 2 + 10^{-7}}{3} = 7 \cdot 10^{-8} \tag{5}$$

Accordingly, as exemplified in the foregoing, the "total risk value" provides a more or less continuous estimate of the risk exposure of the path planning development-module throughout a drive, and moreover how the risk exposure evolves over time. As mentioned in the foregoing, this approach provides a continuous measure between no risk and crash as opposed to other existing methods to evaluate the performance of automated/autonomous vehicles. The estimate of the total risk, as presented herein, results in a fine-grained measure of the risk that the path planning development-module (and in extension, the vehicle and its occupants) has been exposed to. Rather than just being able to add the number of hours without an incident, it is possible to compare individual hours driven.

Figure 6:
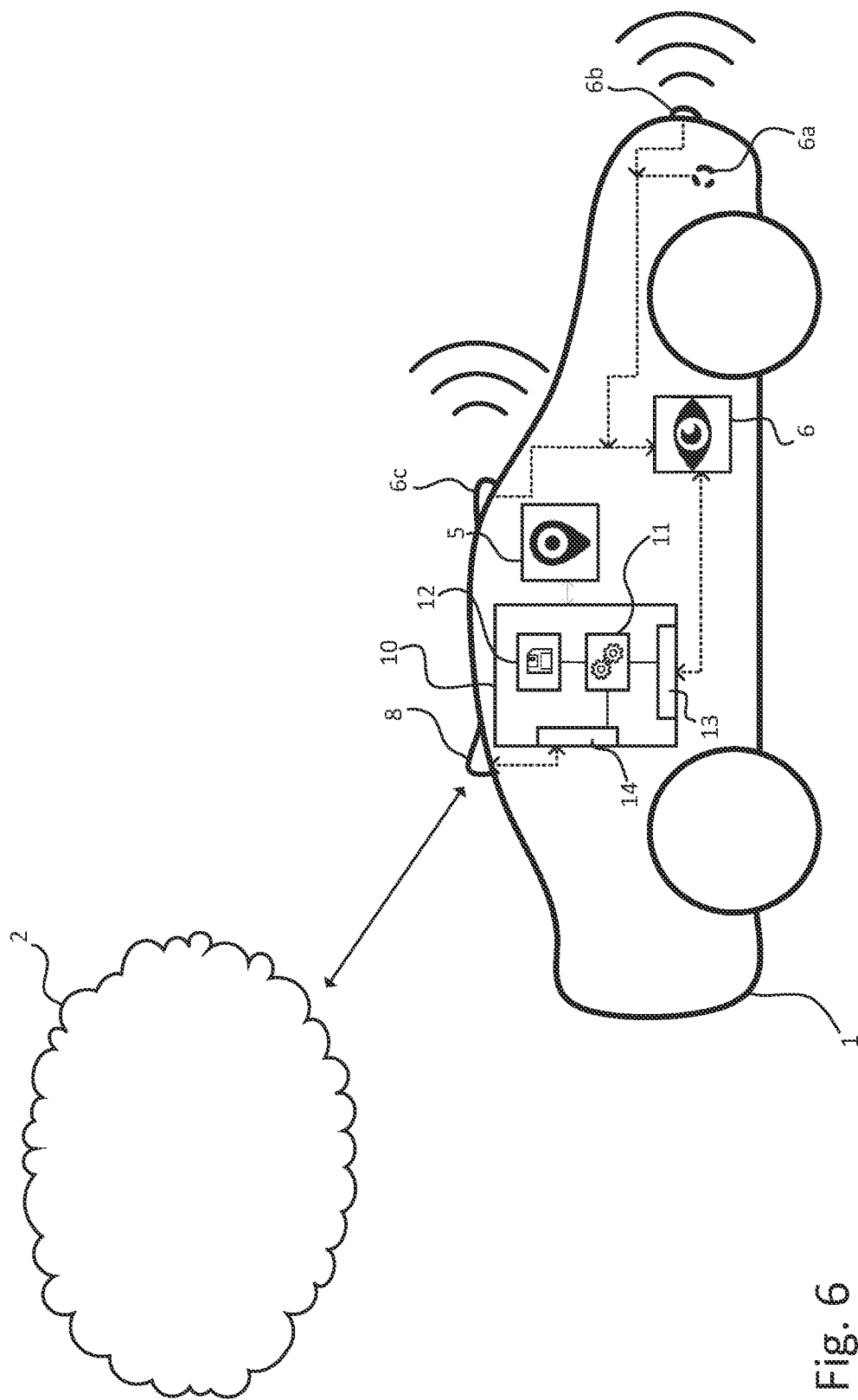
FIG. 6 is a schematic side-view of a vehicle comprising an apparatus for automated development a path planning module of a vehicle in accordance with an embodiment of the present invention.

FIG. 6 is a schematic side view illustration of a vehicle 1 comprising an apparatus 10 for automated development of a path planning development-module of an ADS-equipped vehicle in accordance with an embodiment of the present invention. The vehicle 1 further comprises a perception module/system 6 (i.e. the perception system of the production platform), and a localization system 5. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception module/system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The apparatus 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method f for automated development of a path planning module of a vehicle 1 according to any one of the embodiments disclosed herein. Stated differently, the memory 12 of the apparatus 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The apparatus 10 comprises control circuitry 11 configured to obtain a candidate path from the path planning development-module. The path planning development-module is configured to generate the candidate path for execution by the vehicle based on a path planning model and data indicative of the surrounding environment of the vehicle.

The control circuitry 11 is further configured to obtain a risk map of a surrounding environment of the vehicle, wherein the risk map is formed based on an actuation capability of the vehicle and a location of free-space areas in the surrounding environment. The actuation capability comprises an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Moreover, the risk map further has a temporal component indicative of a time evolution of the risk parameters of the area segments based on a predicted temporal evolution of the free-space areas for at least a duration of time defined by a predicted duration of the candidate path.

The control circuitry 11 is further configured to determine a risk value for the candidate path based on the risk parameters of the area segments to be intersected by the candidate path, and if the determined risk value satisfies at least one risk criterion, the control circuitry 11 is further configured to:

Generate, at an output, a first control signal indicative of an instruction for the ADS to execute the candidate path.

Obtain at least one quality parameter of the executed candidate path, wherein the at least one quality parameter is indicative of a performance of the candidate path in terms of quality and/or comfort of the executed candidate path.

Determine a cost function indicative of a performance of the path planning development-module based on the obtained at least one quality parameter.

Update one or more parameters of the path planning model by means of an optimization algorithm configured to optimize the determined cost function.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The apparatus 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, data may be sent to an external system and that system performs the steps to evaluate the candidate paths. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of obtaining a candidate path and obtaining a risk map may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method performed by an in-vehicle computing system for automated development of a path planning development-module of a vehicle, wherein the vehicle is equipped with an Automated Driving System, ADS, the method comprising:
    obtaining a candidate path from the path planning development-module, wherein the path planning development-module is configured to generate the candidate path for execution by the vehicle based on a path planning model and data indicative of the surrounding environment of the vehicle;
    obtaining a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas,
    wherein the risk map comprises a risk parameter for each of a plurality of area segments comprised in the surrounding environment of the vehicle, and
    wherein the risk map further has a temporal component indicative of a time evolution of the risk parameters of the area segments based on a predicted temporal evolution of the free-space areas for at least a duration of time defined by a predicted duration of the candidate path;
    determining a risk value for the candidate path based on the risk parameters of the area segments to be intersected by the candidate path; and
    if the determined risk value satisfies at least one risk criterion, the method further comprises:
        generating, at an output, a first control signal indicative of an instruction for the ADS to execute the candidate path;
        obtaining at least one quality parameter of the executed candidate path, wherein the at least one quality parameter is indicative of a performance of the candidate path in terms of quality and/or comfort of the executed candidate path;
        determining a cost function indicative of a performance of the path planning development-module based on the obtained at least one quality parameter; and
        updating one or more parameters of the path planning model by means of an optimization algorithm configured to optimize the determined cost function.

2. The method according to claim 1, wherein the at least one quality parameter comprises at least one of: lateral acceleration, longitudinal acceleration, vertical acceleration, jerk, path length, roll acceleration, pitch acceleration, yaw acceleration, and fuel consumption.

3. The method according to claim 1, wherein the step of determining the risk value comprises:
    determining an aggregated risk value for the candidate path based on the risk parameters of a set of area segments to be intersected by the candidate path,
    wherein the at least one risk criterion comprises an aggregated risk threshold, and wherein step of generating, at an output, the first control signal indicative of an instruction for the ADS to execute the candidate path is only performed if the aggregated risk value is lower than the aggregated risk threshold.

4. The method according to claim 3, wherein the step of determining an aggregated risk value comprises:
    aggregating the risk parameters of the set of area segments to be intersected by the candidate path.

5. The method according to claim 1, wherein the step of determining the risk value further comprises:
    determining a total risk value of the path planning development-module based on the risk parameters of a set of area segments intersected by at least one previously executed path, wherein the set of area segments intersected by at least one previously executed path is associated with a previously obtained risk map of the same time period as the at least one previously executed path, and wherein the at least one risk criterion comprises a total risk threshold, and wherein step of generating, at an output, the first control signal indicative of an instruction for the ADS to execute the candidate path is only performed if the total risk value is lower than the total risk threshold.

6. The method according to claim 5, wherein the step of determining the total risk value comprises:

averaging the risk parameters of the set of area segments intersected by the at least one previously executed path in order to determine an average risk exposure of the path planning development-module, the average risk exposure defining the total risk value.

7. The method according to claim 6, wherein the step of averaging the risk parameters comprises:

for each time sample:
determining a current risk value of the path planning development-module based on a set of area segments intersected by a most recently executed candidate path since a preceding time sample;
determining a current compounded risk value by summing the current risk value with a previously computed compounded risk value for the preceding time sample; and
determining an average risk exposure by dividing the current compounded risk value with a total number of samples used up until and including a current time sample.

8. The method according to claim 1, further comprising:
obtaining a back-up path from a production platform of the vehicle, the production platform comprising a validated path planning development-module configured to generate the back-up path; and
if the determined risk value fails to satisfy the at least one risk criterion, the method further comprises:
generating, at an output, a second control signal so to execute the obtained back-up path; and
deactivating the path planning development-module.

9. The method according to claim 8, further comprising:
if the determined risk value fails to satisfy the at least one risk criterion:
generating, at an output, a second control signal so to activate a path planner of the production platform of the vehicle for generating candidate paths to be executed by the vehicle.

10. The method according to claim 1, further comprising:
transmitting the one or more updated parameters of the path planning model of the path planning development-module to a remote entity;
receiving a set of globally updated parameters of the path planning model of the path planning development-module from the remote entity, wherein the set of globally updated parameters are based on information obtained from a plurality of vehicles comprising the path planning development-module; and
updating the path planning model of the path planning development-module based on the received set of globally updated parameters.

11. The method according to claim 1, wherein each risk parameter is indicative of at least one of a probability of an accident event if the vehicle were to occupy an associated area segment and a probability of violating a predefined safety threshold.

12. The method according to claim 1, wherein the location of free-space areas comprises:
a position of external objects located in the surrounding environment of the vehicle, and wherein the estimated position of the external objects includes uncertainties of the position of the external objects, trajectories of any dynamic objects of the external objects and uncertainties of the estimated trajectories of the dynamic objects.

13. A non-transitory computer-readable storage medium storing one or more instructions configured to be executed by one or more processors of an in-vehicle processing system, the one or more instructions for performing the method according to claim 1.

14. An apparatus for automated development a path planning development-module of a vehicle, wherein the vehicle is equipped with an Automated Driving System, ADS, the apparatus comprising control circuitry configured to:
obtain a candidate path from the path planning development-module, wherein the path planning development-module is configured to generate the candidate path for execution by the vehicle based on a path planning model and data indicative of the surrounding environment of the vehicle;
obtain a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas,
wherein the risk map comprises a risk parameter for each of a plurality of area segments comprised in the surrounding environment of the vehicle, and
wherein the risk map further has a temporal component indicative of a time evolution of the risk parameters of the area segments based on a predicted temporal evolution of the free-space areas for at least a duration of time defined by a predicted duration of the candidate path;
determine a risk value for the candidate path based on the risk parameters of the area segments to be intersected by the candidate path; and
if the determined risk value satisfies at least one risk criterion, the control circuitry is further configured to:
generate, at an output, a first control signal indicative of an instruction for the ADS to execute the candidate path;
obtain at least one quality parameter of the executed candidate path, wherein the at least one quality parameter is indicative of a performance of the candidate path in terms of quality and/or comfort of the executed candidate path;
determine a cost function indicative of a performance of the path planning development-module based on the obtained at least one quality parameter; and
update one or more parameters of the path planning model by means of an optimization algorithm configured to optimize the determined cost function.

15. A vehicle comprising:
a set of vehicle-mounted sensors configured to monitor a surrounding environment of the vehicle;
an automated driving system, ADS, comprising:
a perception system configured to generate perception data based on sensor data obtained from one or more of the set of vehicle-mounted sensors;

a production-platform path planner;

a path planning development-module configured to generate a candidate path for execution by the vehicle; and an apparatus for automated development the path planning development-module of the vehicle, wherein the vehicle is equipped with ADS, the apparatus comprising control circuitry configured to:

obtain a candidate path from the path planning development-module, wherein the path planning development-module is configured to generate the candidate path for execution by the vehicle based on a path planning model and data indicative of the surrounding environment of the vehicle;

obtain a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas, wherein the risk map comprises a risk parameter for each of a plurality of area segments comprised in the surrounding environment of the vehicle, and wherein the risk map further has a temporal component indicative of a time evolution of the risk parameters of the area segments based on a predicted temporal evolution of the free-space areas for at least a duration of time defined by a predicted duration of the candidate path;

determine a risk value for the candidate path based on the risk parameters of the area segments to be intersected by the candidate path; and if the determined risk value satisfies at least one risk criterion, the control circuitry is further configured to:

generate, at an output, a first control signal indicative of an instruction for the ADS to execute the candidate path;

obtain at least one quality parameter of the executed candidate path, wherein the at least one quality parameter is indicative of a performance of the candidate path in terms of quality and/or comfort of the executed candidate path;

determine a cost function indicative of a performance of the path planning development-module based on the obtained at least one quality parameter; and update one or more parameters of the path planning model by means of an optimization algorithm configured to optimize the determined cost function.

* * * * *